US008172410B2

(12) United States Patent  (10) Patent No.: US 8,172,410 B2
Rummer et al.  (45) Date of Patent: May 8, 2012

(54) ADJUSTABLE AUXILIARY MIRROR ASSEMBLY

(75) Inventors: Andrew M Rummer, Forsyth, IL (US); Robert M Vize, Forsyth, IL (US)

(73) Assignee: Caterpillar Inc., Peoria, IL (US)

( * ) Notice: Subject to any disclaimer, the term of this patent is extended or adjusted under 35 U.S.C. 154(b) by 1038 days.

(21) Appl. No.: 11/876,530

(22) Filed: Oct. 22, 2007

(65) Prior Publication Data

US 2009/0103197 A1  Apr. 23, 2009

(51) Int. Cl.
G02B 5/08 (2006.01)
G02B 5/10 (2006.01)
G02B 7/182 (2006.01)

(52) U.S. Cl. ......... 359/864; 359/865; 359/850; 359/840

(58) Field of Classification Search .................. 359/840, 359/850, 864, 865
See application file for complete search history.

(56) References Cited

U.S. PATENT DOCUMENTS

| | | | | |
|---|---|---|---|---|
| 2,118,962 A | * | 5/1938 | Barron | 359/605 |
| 2,140,069 A | * | 12/1938 | Bostwick | 359/854 |
| 2,605,676 A | * | 8/1952 | Couch | 359/854 |
| 2,636,419 A | | 4/1953 | Kerr | |
| 2,649,028 A | * | 8/1953 | Lenta | 359/854 |
| 2,802,394 A | * | 8/1957 | Krone | 359/854 |
| 3,048,084 A | | 8/1962 | Iannuzzi | |
| 3,617,113 A | * | 11/1971 | Hoyer | 359/847 |
| 3,751,140 A | * | 8/1973 | Berlin et al. | 359/840 |
| 4,487,479 A | * | 12/1984 | Tolomeo, Sr. | 359/854 |
| 4,598,982 A | * | 7/1986 | Levine | 359/865 |
| 4,605,291 A | * | 8/1986 | Jolly | 359/862 |
| 4,695,138 A | * | 9/1987 | Epstein | 359/854 |
| 4,718,756 A | | 1/1988 | Lancaster | |
| 4,824,231 A | * | 4/1989 | Quintana | 359/864 |
| 4,863,254 A | | 9/1989 | Dyer | |
| 4,892,400 A | | 1/1990 | Brookes et al. | |
| 4,906,088 A | | 3/1990 | Casey et al. | |
| 4,921,340 A | | 5/1990 | Dyer | |
| 4,927,255 A | * | 5/1990 | Martinez | 359/855 |
| 5,153,781 A | * | 10/1992 | Brandt | 359/865 |
| 5,165,081 A | | 11/1992 | Drumheller | |
| 5,691,855 A | * | 11/1997 | Lupkas | 359/866 |
| 5,870,236 A | | 2/1999 | Barksdale | |
| 6,193,377 B1 | * | 2/2001 | Spigner | 359/602 |
| 6,305,809 B1 | * | 10/2001 | Zadro | 359/840 |
| 6,312,133 B1 | | 11/2001 | Koukichi | |
| 6,467,918 B2 | | 10/2002 | Strode et al. | |
| 6,926,416 B2 | * | 8/2005 | Sawyer | 359/855 |
| 6,932,484 B2 | * | 8/2005 | Brandt et al. | 359/865 |
| 7,059,734 B1 | | 6/2006 | Hu | |
| 7,207,683 B2 | | 4/2007 | Lewis | |
| 7,316,485 B2 | * | 1/2008 | Roose | 359/844 |
| 2004/0218294 A1 | | 11/2004 | Chen | |

* cited by examiner

Primary Examiner — Ricky D Shafer
(74) Attorney, Agent, or Firm — Leydig, Voit & Mayer

(57) ABSTRACT

A mirror assembly comprising primary and auxiliary mirror assemblies having complimentary recesses and protrusions on respective frame portions of the assemblies, the auxiliary mirror assembly adapted to be disposed at a plurality of positions along the primary mirror assembly when the recesses and protrusions are disposed in interfitting engagement.

20 Claims, 6 Drawing Sheets

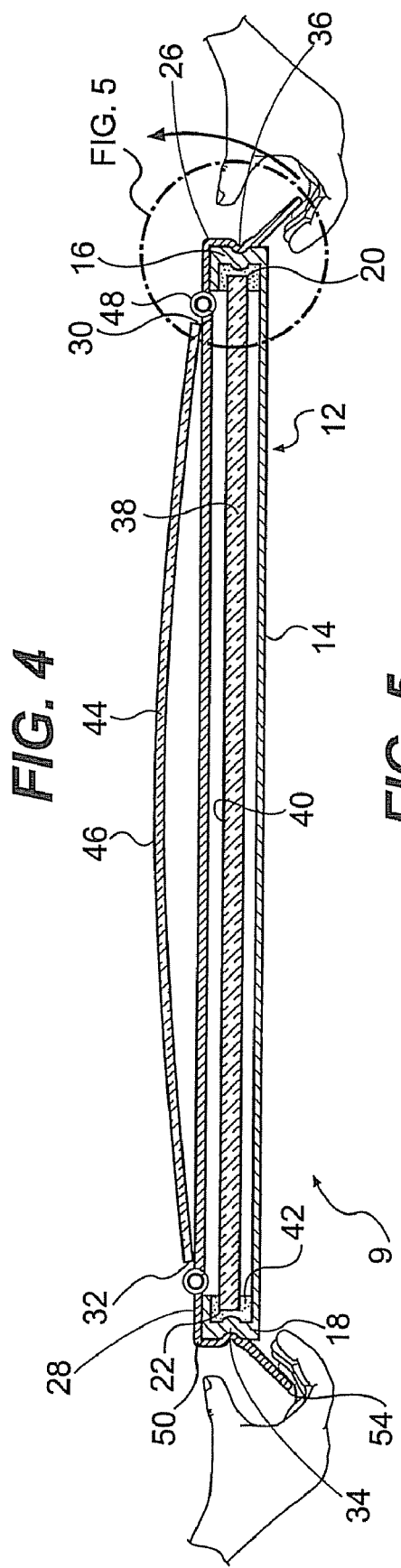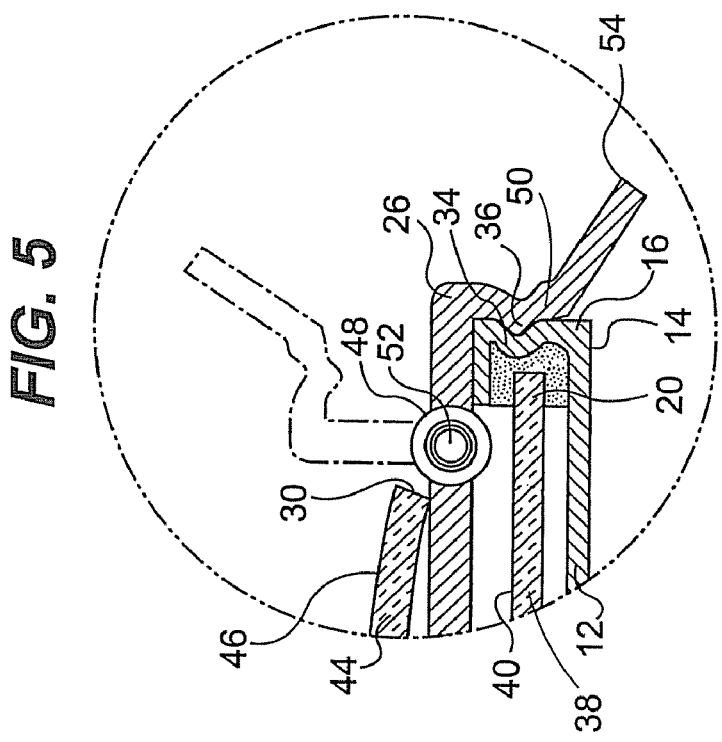

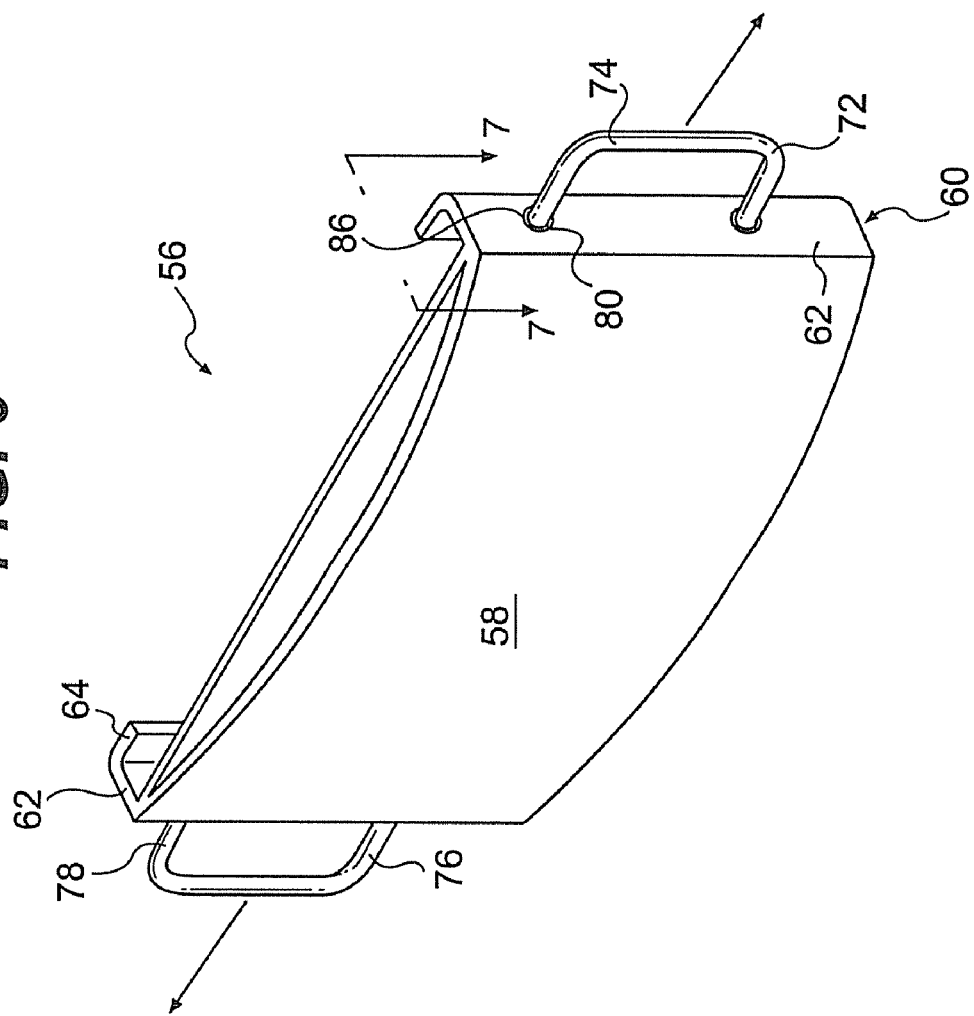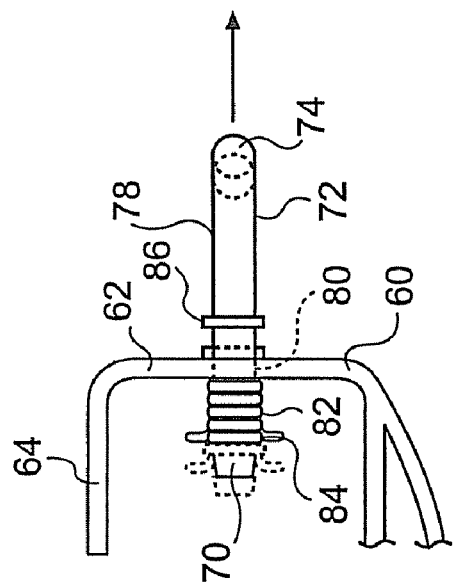

ADJUSTABLE AUXILIARY MIRROR ASSEMBLY

TECHNICAL FIELD

This patent disclosure relates generally to mirror assemblies, and, more particularly, to auxiliary mirror assemblies for use in vehicles.

BACKGROUND

Mirror arrangements in vehicles typically provide limited views of the surrounding area. While a plurality of mirrors placed at varied locations may be provided, blind spots that are obscured from view are common. As a result, secondary or auxiliary mirrors are commonly used to augment primary, typically existing mounted mirror arrangements.

Auxiliary mirrors are particularly important in large commercial vehicles wherein an operator's ability to view the areas around the vehicle can be critical to safe and efficient operation of the vehicle. Such commercial vehicles, however, are often subjected to abrupt movements and vibrations as a result factors such as operator skills, the terrain surrounding the vehicle, the nature of any operations being performed by the vehicle, and vibrations resulting from the operation of the engines and hydraulic systems of the vehicle. During use, these abrupt movements and vibrations can result is dislodgment or reorientation of the auxiliary mirror, necessitating replacement or adjustment of the auxiliary mirror.

One example of a convex, auxiliary mirror that may be clamped onto a primary rear view mirror or the like is disclosed in U.S. Pat. No. 5,165,081 to Drumheller. The Drumheller mounting arrangement includes a pair of L-shaped brackets having intersecting back plates that are disposed along the back surface of the rear view mirror. The intersecting back plates are secured together by either a thumbscrew or a stiff coil spring that allows the L-shaped brackets to be pulled outward to unclamp the primary mirror. The Drumheller auxiliary mirror is coupled to the L-shaped brackets by a ball joint arrangement and extends outwardly from the periphery of the primary rear view mirror. Although, the Drumheller mirror generally does not obstruct the view provided by the primary mirror, the ball joint arrangement allows for adjustment of the auxiliary mirror such that it can be rotated inward to partially obstruct the face of the primary mirror. In view of the overlapping back plates of the L-shaped brackets extending along the back surface of the mirror, however, the mounting arrangement of the primary rear view mirror may limit the placement of the Drumheller mirror relative to the primary mirror.

An alternate arrangement provides an auxiliary mirror assembly backed with an adhesive material, the auxiliary mirror being secured to the face of the primary mirror. Such an arrangement is frequently used in commercial vehicles, which include relatively large primary mirrors. Unfortunately, however, the auxiliary mirror may work its way loose or detach as a result of vehicle vibrations, particularly in applications where significant vibration is the norm. Moreover, once placed, the auxiliary mirror may not be readily repositioned to accommodate a new operator, or to adapt to changing operator preferences.

It is therefore desirable to provide a better arrangement for providing an operator a better view than would be provided by a primary mirror alone or with primary designs of auxiliary mirrors. The present disclosure is directed to overcoming one or more of the problems set forth above.

SUMMARY

The disclosure describes, in one aspect, a mirror assembly comprising primary and auxiliary mirror assemblies. The primary mirror assembly includes a primary mirror having opposed side edges, and a frame. The frame includes portions that extend along at least a portion of the opposed side edges of the primary mirror, but need not extend all of the way around the mirror. At least one of said frame portions includes at least one of a plurality of recesses or protrusions. The auxiliary mirror assembly includes an auxiliary mirror having side edges, and a frame. The auxiliary mirror frame includes portions that extend along at least a portion of opposed side edges of the auxiliary mirror, but need not extend around the entire auxiliary mirror. At least one of said auxiliary mirror frame portions includes at least one recess or protrusion configured for intermitting engagement with at least two of the recesses or protrusions of the primary mirror frame portions to position the auxiliary mirror in at least two positions along the primary mirror assembly.

In another aspect of the disclosure, there is provided an auxiliary mirror assembly for coupling to a primary mirror assembly that includes a primary mirror having opposed side edges, and a frame having portions extending along at least a portion of the opposed side edges of the primary mirror. The auxiliary mirror assembly comprises an auxiliary mirror having side edges and a frame. The auxiliary mirror frame includes portions that extend along at least a portion of opposed side edges of the auxiliary mirror. The auxiliary mirror frame portions are adapted to be disposed substantially adjacent at least a portion of the primary mirror frame portions. At least one of the auxiliary mirror frame portions is biased into engagement with the primary mirror frame portions by at least one torsion spring.

In another aspect of the disclosure, there is provided an auxiliary mirror retrofit arrangement for use with a primary mirror assembly, which includes a primary mirror having opposed side edges, and a frame including portions extending along at least a portion of the opposed side edges of the primary mirror. The retrofit arrangement includes at least one strip of material that is adapted to be secured to at least one of the primary mirror frame portions, and an auxiliary mirror assembly. The strip includes at least one of a plurality of recesses or protrusions. The auxiliary mirror assembly includes an auxiliary mirror having opposed side edges, and a frame including portions extending along at least a portion of opposed side edges of the auxiliary mirror. At least one of said auxiliary mirror frame portions includes at least one recess or protrusion configured for interfitting engagement with at least a portion of the recesses or protrusions of the strip to position the auxiliary mirror in at least two positions along the primary mirror assembly.

As used herein, the term "primary mirror assembly" is intended to mean a first mirror assembly that is mounted or is to be mounted. The term "auxiliary mirror assembly" as used herein is intended to mean a second or supplemental mirror assembly, that is, a mirror assembly other than the primary mirror assembly. The primary and auxiliary mirror assemblies may be provided separately or as a unit. The term "opposed sides" is intend to mean the opposed peripheral edges of the mirror, either side-to-side, or top to bottom, as opposed to the front and back faces of the mirror assembly.

BRIEF DESCRIPTION OF THE DRAWING(S)

FIG. 1 a side elevational view of a machine incorporating a mirror arrangement according to the disclosure.

FIG. 4 is an enlarged cross-sectional view of the auxiliary mirror assembly and primary mirror taken along line 4-4 in FIG. 2.

FIG. 5 is an enlarged fragmentary view of a section identified in FIG. 4, an unengaged position of the handle being shown in phantom.

FIG. 6 is an isometric view of an alternate embodiment of an auxiliary mirror assembly for placement on a primary mirror.

FIG. 7 is a fragmentary top view of an end of the auxiliary mirror assembly taken along line 7-7 in FIG. 6.

DETAILED DESCRIPTION

Figure 1:
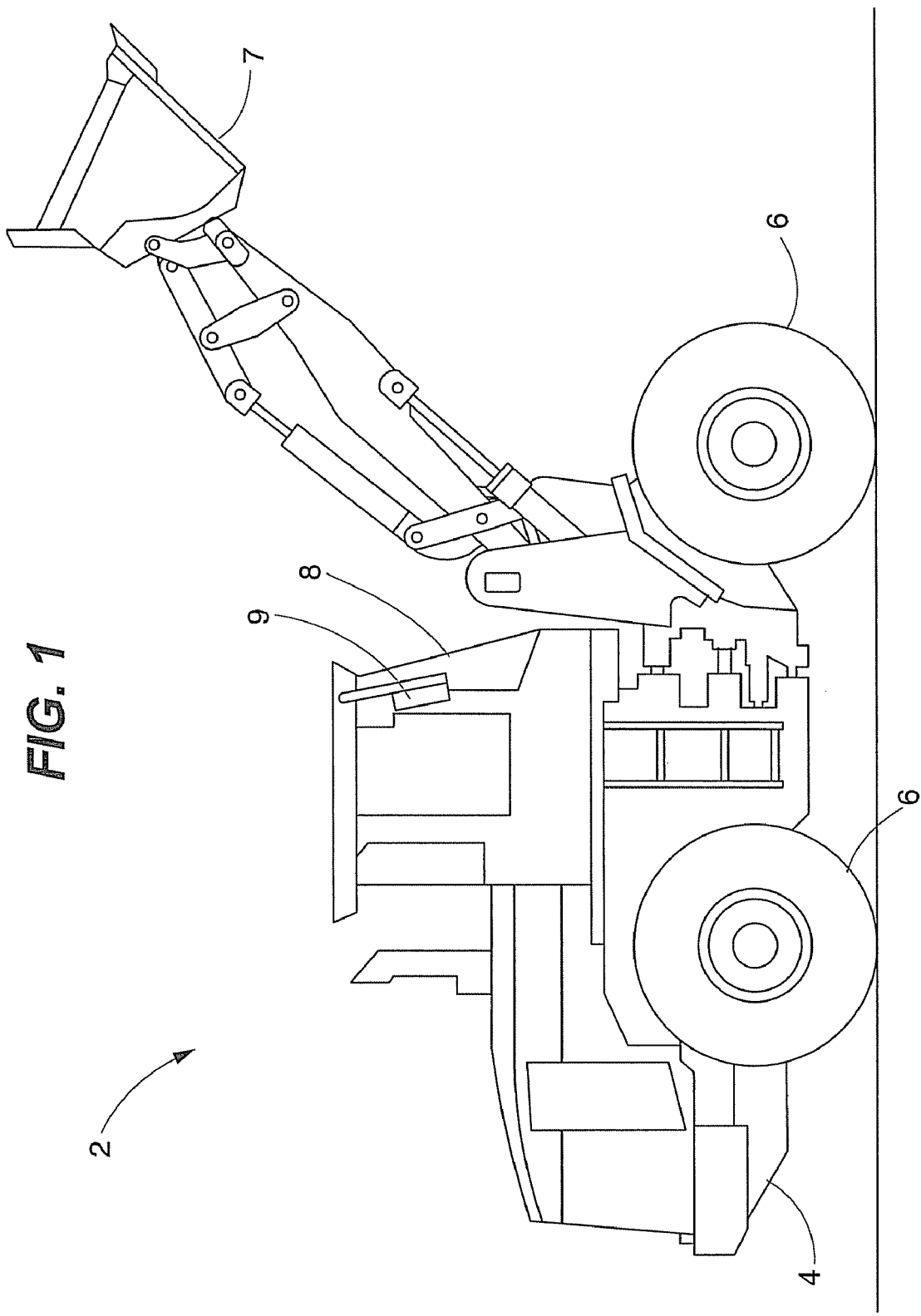

The present disclosure provides a mirror assembly including a primary mirror assembly and an auxiliary mirror assembly. There is shown in FIG. 1, an exemplary embodiment of a machine 2 that includes a frame 4 supported on a plurality of motivators, such as wheels 6, located on opposing sides of the machine 2. The frame 4 typically supports an engine (not visible), an implement 7, and a cab or operator station 8 from which an operator may control movement of the machine 2. In order to provide the operator a view of the environment within and/or about the machine 2, the machine 2 further includes a mirror assembly 9.

Figure 2:
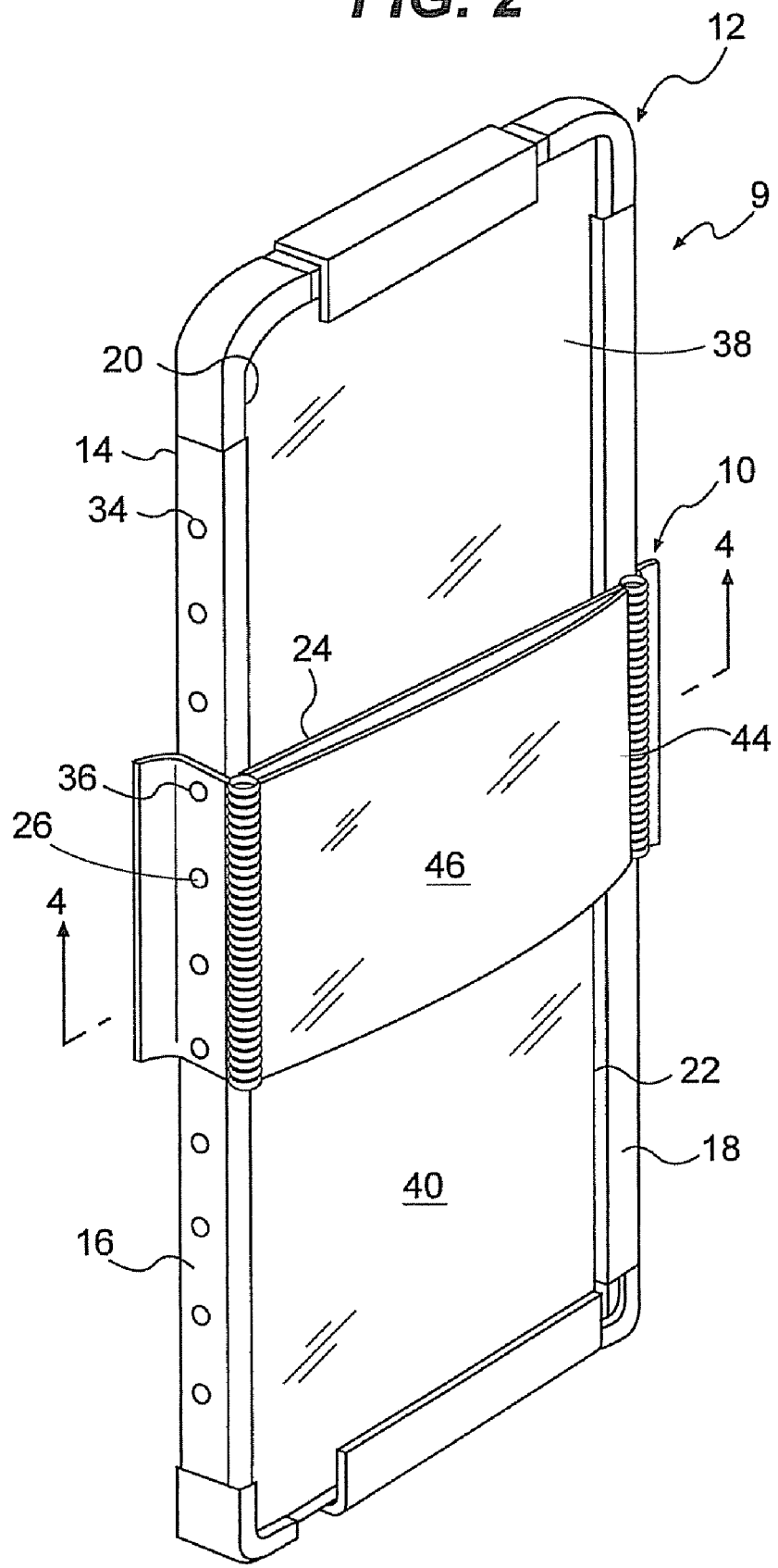
FIG. 2 is an isometric view of a primary mirror assembly and auxiliary mirror assembly according to an embodiment of the disclosure.

This disclosure relates to the mirror assembly 9, and, referring to FIG. 2, more particularly, to an auxiliary mirror assembly 10 for attachment to a primary mirror assembly 12 in order to provide environmental visuals augmenting the visuals provided by the primary mirror assembly 12. The primary mirror assembly 12 includes a frame 14 at least having portions 16, 18 that extend along at least the opposed sides 20, 22 of the primary mirror assembly 12. Similarly, the auxiliary mirror assembly 10 includes a frame 24 at least having portions 26, 28 that extend along opposed sides 30, 32 of the auxiliary mirror assembly 10.

To affirmatively couple the auxiliary mirror assembly 10 to the primary mirror assembly 12, the frame portions 16, 18 of the primary mirror assembly 12 and the frame portions 26, 28 of the auxiliary mirror assembly 10 include complimentary recesses 34 and protrusions 36 that are sized and disposed for interfitting engagement to secure the auxiliary mirror assembly 10 to the primary mirror assembly 12. Although the illustrated embodiment shows the protrusions 36 disposed on the auxiliary mirror assembly 10 and recesses 34 disposed on the primary mirror assembly 12, the protrusions may alternately be disposed on the primary mirror assembly 12 and the recesses on the auxiliary mirror assembly 10, or there may be a combination of protrusions and recesses on each of the primary and auxiliary mirror assemblies 12, 10. In any event, however, in use, the protrusions 36 engage the recesses 34 along either side 20, 22, 30, 32 to couple auxiliary mirror assembly 10 to the primary mirror assembly 12.

Figure 8:
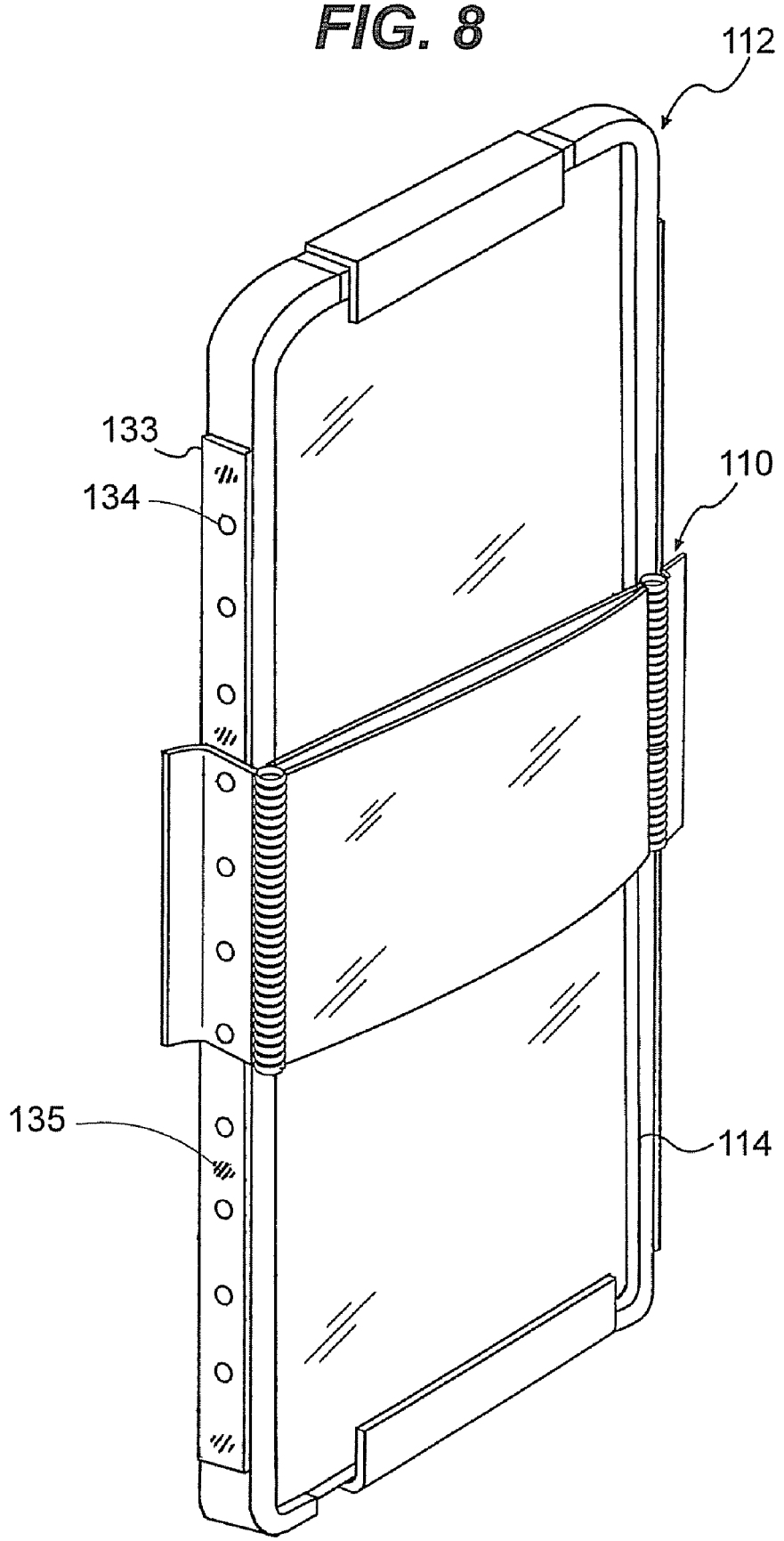
FIG. 8 is an isometric view of another alternate embodiment of a primary mirror assembly and auxiliary mirror assembly.

While the recesses 34 are shown in the form of indentations, the recesses may be of any suitable design and provided in any suitable manner. For example, in another embodiment, the recesses may be in the form of bores or the like. Such recesses 34 may be formed directly in the frame 14, as shown, or recesses in the form of indentations or bores may be formed in a supplemental strip of material that may then be secured to the frame, as by welding, adhesive, interference fit, or other coupling, or the like, such as illustrated in FIG. 8. In this embodiment, at least one strip of material 133 having a plurality of recesses in the form of bores 134 therethrough is secured to the frame 114 of a primary mirror assembly 112. In this embodiment, the strip 133 is spot welded to the frame 114 at various locations 135 along the length of the strip 133, although an alternate attachment such as an adhesive, rivets, threaded fasteners or the like may be provided. It will be appreciated that one or more such strips 133 and the auxiliary mirror assembly 110 may be provided as a single unit in order to retrofit an existing primary mirror assembly if so desired.

Similarly, while the protrusions 36 are illustrated in the form of outwardly facing dimples, the protrusions may be of any suitable design and provided in any suitable manner. For example, the protrusions may be in the form of screws, rods, or the like. The protrusions may be formed directly with the frame 24, as illustrated in FIGS. 1-4, or they may be formed in a supplemental strip of material that may then be secured to the frame, as explained with regard to the recesses. Alternately, the protrusions may extend through portions of the frame, as may be the case with a screw or the like which extends through bores in one frame and into the recesses of the other frame.

An exemplary primary mirror assembly 12 is shown in FIG. 2, and in greater detail in FIGS. 4 and 5. The primary mirror assembly 12 includes a mirror 38 defining a reflective surface 40. An isolative or dampening element 42 may be provided between the primary mirror 38 and the frame 14, although such an element 42 is optional. The frame 14 may extend entirely around the periphery of the mirror 38, or only around only portions of the periphery of the mirror 38, so long as it includes portions 16, 18 that extend along opposed sides 20, 22 of the mirror 38. The opposed sides 20, 22 may be lateral sides of the mirror 38, as illustrated, or the top and bottom of the mirror 38.

Figure 3:
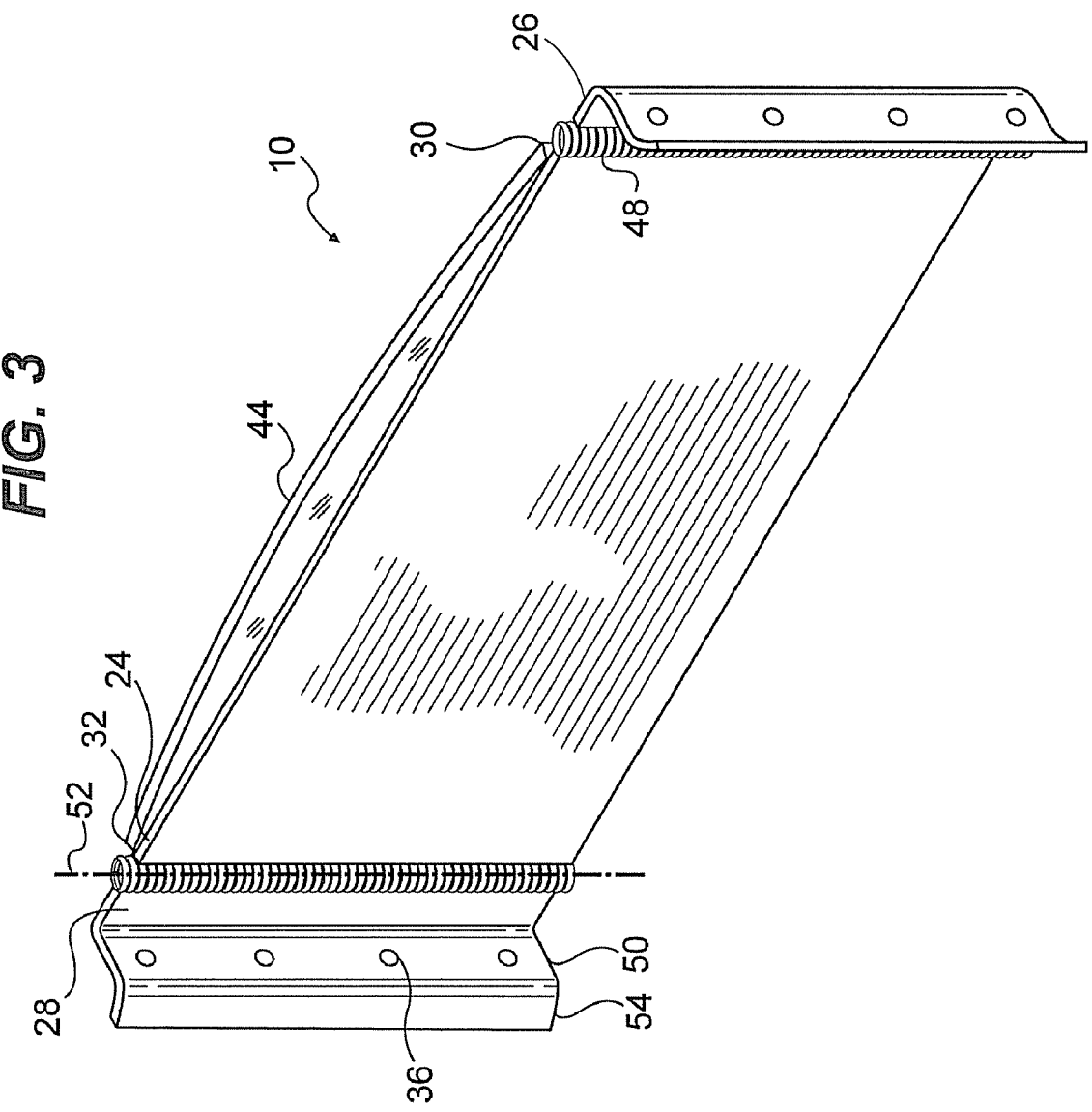
FIG. 3 is an enlarged isometric view of the auxiliary mirror assembly of FIG. 2.

An exemplary auxiliary mirror assembly 10 is shown in greater detail in FIGS. 3-5. The auxiliary mirror assembly 10 includes a mirror 44 having a reflective surface 46. The auxiliary mirror 44 itself may be of any desired configuration such as, by way of example only, a conventional flat mirror, a magnifying mirror, or a convex mirror, such as the mirror 44 illustrated. As with the frame 14 of the primary mirror assembly 12, the frame 24 may have any appropriate configuration so long as it includes portions 26, 28 that extend along opposed sides 30, 32 of the mirror 44.

Returning to the coupling arrangement between the mirror assemblies 10, 12, to assist in placement of the auxiliary mirror assembly 10 on the primary mirror assembly 12, the auxiliary mirror assembly 10 may include one or more springs 48 that bias the protrusions 36 or recesses of the auxiliary mirror assembly 10 inwardly, that is, into engagement with the cooperating recesses 34 or protrusions of the primary mirror assembly 12. In the embodiment of FIGS. 2-5, the protrusions 36 of the auxiliary mirror frame 24 are spring biased toward the recesses 34 of the primary mirror frame 14 when the auxiliary mirror assembly 10 is disposed on the primary mirror assembly 12. In this embodiment, the auxiliary mirror frame 24 includes flanges 50, and the protrusions 36 extend from the flanges 50. The flanges 50 are then spring biased toward the primary mirror frame 14. While any appropriate biasing arrangement may be utilized, in this embodiment, at least one torsion spring 48 is associated with each of the flanges 50. In this way, the flanges 50 pivot about axis 52, allowing the user to pivot the protrusions 36 into and out of engagement with the primary mirror assembly 12, as shown in more detail in the enlarged view of FIG. 5. The torsion springs 48 may be secured or otherwise coupled to the auxiliary mirror assembly 10 by any appropriate mechanism.

To facilitate the user's placement, and the movement and engagement of the auxiliary mirror assembly 10 with the primary mirror assembly 12, one or more handles 54 may be provided. The handles 54 of the embodiment illustrated in FIGS. 2-5 extend from the flanges 50, although they may be alternately disposed and may be of any appropriate design so long as they may be grasped by the user during placement or adjustment of the auxiliary mirror assembly 10.

In order to permit the auxiliary mirror assembly 10 to be positioned at an optimal position along the primary mirror assembly, the opposed peripheral edges of the primary mirror frame 14 may include a plurality of such protrusions or recesses 34. In the illustrated embodiment, the primary mirror frame 14 includes a plurality of recesses 34. In this way, the auxiliary mirror assembly 10 may be positioned at multiple locations along the primary mirror assembly 12, providing the user with optimal placement for viewing. In use, at least a portion of the surface 40 of the primary mirror 38 may be visible when the auxiliary mirror assembly 10 is mounted, providing the user various options for placement of the auxiliary mirror assembly 10 along the primary mirror assembly 12.

FIGS. 6 and 7 illustrate another exemplary embodiment of an auxiliary mirror assembly 56 that may be utilized with the primary mirror assembly 12 illustrated in FIG. 2. In this embodiment, the auxiliary mirror assembly 56 includes a mirror 58 and a frame 60 having flanges 62, 64 that, in use, extend along opposed sides and rear of the primary mirror frame 14. In this embodiment, the flanges 62, 64 are fixed, rather than pivotable. Protrusions 70 extend inwardly from the flanges 62 toward the primary mirror frame 14 in use. To allow the protrusions 70 to be engaged or disengaged from the recesses 34 of the primary mirror frame 14, the protrusions 70 are axially movable, rather than pivotable, with respect to the remainder of the auxiliary mirror frame 60.

In order to allow the user to selectively engage (as shown in dotted lines in FIG. 7) and disengage (as shown in solid lines in FIG. 7) the protrusions 70 from the recesses 34, one or more handles 72 are provided. Here, the handle 72 is shown as having a general U-shape having a transverse section 74 and legs 76, 78, although alternate designs are envisioned. The legs 76, 78 extend through a pair of bores 80 through the flange 62, the distal ends of the legs 76, 78 of the illustrated embodiment forming the protrusions 70. One or more compression springs 82 bias the protrusions 70 toward the recesses 34 in use, flanges 84 or other enlarged portion(s) retaining the compression springs 82 about the protrusions 70/legs 76, 78. The movement of the protrusions 70/legs 76, 78 through the bores 80 is further limited by flanges 86 or other enlarged portions, which are disposed along the outside of the flange 62.

In this way, during placement or movement of the auxiliary mirror assembly 56, the user pulls outward on the transverse section 74 of the handle 72 to compress the spring(s) 82 and disengage the protrusions 70 at the distal ends of the legs 76, 78 from the recesses 34 of the primary mirror assembly 12. Once properly placed, the user releases the handle 72, and the force of the compression spring(s) 82 moves the protrusions 70 into the recesses 34 of the primary mirror assembly 12.

Other arrangements of the auxiliary mirror assembly are likewise appropriate under this disclosure. For example, in the arrangement illustrated in FIGS. 6 and 7, rather than including the handles 72 illustrated, the protrusion may be provided in the form of one or more screws or bolts that are selectively engageable with the bores 80 and recesses 34. Further, the protrusions or recesses need not extend along both sides of the auxiliary mirror, so long as there is sufficient engagement between the protrusions and recesses and sufficient retaining force to maintain the respective positions of the auxiliary and primary mirrors. By way of example only, the frame along one side of the auxiliary mirror assembly may be adapted to extend along a side and back surface of the primary mirror assembly, while protrusions or recesses along the opposite side of the auxiliary mirror assembly may be adjustable into or out of engagement with cooperating recesses or protrusions along the adjacently disposed side of the primary mirror assembly. Similarly, in arrangements where protrusions and recesses are provided along both of the opposed sides of the mirror assemblies, the protrusions or recesses need not be adjustable into and out of engagement on both sides of the mirror assembly. In this way, it will be appreciated that various arrangements are appropriate within the scope of this disclosure.

Industrial Applicability

The present disclosure provides an auxiliary mirror assembly 10, 56, 110 that may be utilized in conjunction with a primary mirror assembly to enhance visibility provided by the mirror assembly 9. One or more embodiments of the mirror assembly 9, and, in particular, the primary mirror assembly 12, 112 and auxiliary mirror assembly 10, 56, 110, may be particularly suited for use in industrial applications wherein prior art auxiliary mirrors may be vibrated out of engagement with the primary mirror assembly. The protrusions 36, 70, 136 and recesses 34 in one or more embodiments provide a positive engagement that yields a stable coupling of the auxiliary mirror assembly 10, 56, 110 to the primary mirror assembly 12, 112. An example of such an industrial application is illustrated in FIG. 1. Although a wheel loader is illustrated in FIG. 1, the term "machine" may refer to any machine that performs some type of operation associated with an industry such as mining, construction, farming, transportation, or any other industry known in the art. For example, a machine 2 may be an earth-moving machine, such as a wheel loader, excavator, dump truck, backhoe, motorgrader, material handler or the like. Similarly, although an exemplary bucket is illustrated as the attached implement 7, an alternate implement may be included. While no implement need be provided, any implements may be utilized and employed for a variety of tasks, including, for example, loading, compacting, lifting, brushing, and include, for example, buckets, compactors, forked lifting devices, brushes, grapples, cutters, shears, blades, breakers/hammers, augers, and others.

One or more embodiments likewise may be readily replaced, or selectively adjusted in order to accommodate different users and operator preferences based upon not only physical characteristics such as, for example, the size of the operator, adjustments to the seat, and view desired, but also for user preferences regarding the type of auxiliary mirror 44, 58 utilized. The spring-biased nature of the engagement of the protrusions 36, 70 and recesses 34, 134 may allow the user to readily disengage the auxiliary mirror assembly 10, 56 from the primary mirror assembly 12, 112, and recouple the mirror assemblies 10, 56, 12 together. Alternately, protrusions, such as screws or bolts may be selectively engaged or disengaged from the primary and auxiliary mirror assemblies. Inasmuch as the coupling of the auxiliary mirror assembly 10, 56, 110 to the primary mirror assembly 12, 112 extends along the sides and not necessarily along the rear of the primary mirror assembly 12, 112, one or more embodiments may not interfere with the mounting arrangement of the primary mirror assembly, allowing the user enhanced flexibility in placement of the auxiliary mirror assembly. Such embodiments may include multiple recesses or protrusions such that the auxiliary mirror assembly 10, 56, 110 may be coupled to the primary mirror at multiple positions. Screws or other protrusions and recesses may be readily disengaged and reengaged. Further, the auxiliary mirror assembly 10, 56, 100 may readily replaced with an alternate, auxiliary mirror assembly including an alternate mirror configuration, such as, for example, a conventional mirror, convex mirror, or magnifying mirror.

The auxiliary mirror assembly 10, 56, 110 may be provided as part of the original equipment of a vehicle or the like, or as an add-on feature inasmuch as a primary mirror assembly 12, 112 may be easily retrofit to provide complementary structure for engagement with recesses 34, 134 or protrusions 36, 70 of the auxiliary mirror assembly 10, 56. For example, the frame 114 of the primary mirror assembly 112 may be modified to include recesses 134 in the form of indentations or bores, or otherwise formed protrusions. Alternately, separate strips of material 133 including recesses 134 or protrusions may be secured to the primary mirror assembly 112.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A mirror assembly comprising
   a primary mirror assembly, the primary mirror assembly including
      a primary mirror having a reflective face and including opposed side edges, and
      a frame including portions extending along at least a portion of the opposed side edges of the primary mirror, at least one of said frame portions including at least one of a plurality of recesses or protrusions,
   an auxiliary mirror assembly, the auxiliary mirror assembly comprising:
      an auxiliary mirror having opposed side edges,
      a frame including portions extending along at least a portion of opposed side edges of the auxiliary mirror, the auxiliary mirror frame portions being adapted to be disposed substantially adjacent at least a portion of the primary mirror frame portions to at least partially superimpose the auxiliary mirror assembly along the face of the primary mirror, at least one of said auxiliary mirror frame portions including at least one recess or protrusion configured for interfitting engagement with at least two of the recesses or protrusions of the primary mirror frame portions to position the auxiliary mirror assembly in at least two positions along the primary mirror assembly.

2. The mirror assembly of claim 1 further including at least one spring biasing the recess or protrusion of the auxiliary mirror frame portion into interfitting engagement with the recesses or protrusions of the primary mirror frame portion when said auxiliary mirror assembly is disposed substantially adjacent the primary mirror assembly.

3. The mirror assembly of claim 1 further comprising at least one handle operatively connected to at least portion of the recesses or protrusions of the auxiliary mirror frame portion.

4. The mirror assembly of claim 1 wherein said auxiliary mirror frame portions include at least one flange, the flange including at least one said recess or protrusion of the auxiliary mirror frame portions.

5. The mirror assembly of claim 4 wherein a plurality of recesses or protrusions of at least one of the auxiliary mirror frame portions is disposed on said flange.

6. The mirror assembly of claim 4 wherein said auxiliary mirror frame portions each include at least one said flange and at least one protrusion, said flanges including at least one bore therethrough, said at least one auxiliary mirror frame portion protrusion extending through said bore.

7. The mirror assembly of claim 6 wherein said protrusion of the auxiliary mirror frame portion is spring biased relative to said flange.

8. The mirror assembly of claim 7 wherein the spring extends about said protrusion.

9. The mirror assembly of claim 4 wherein said flange is pivotably coupled to said auxiliary mirror frame, the mirror assembly further including at least one spring biasing said flange toward said primary mirror frame.

10. The mirror assembly of claim 9 wherein said at least one spring comprises at least one torsion spring biasing said flange toward said primary mirror frame when the auxiliary mirror assembly is disposed on said primary mirror assembly.

11. The mirror assembly of claim 4 further comprising at least one handle operatively connected to at least a portion of the recesses or protrusions of the auxiliary mirror frame portion.

12. The mirror assembly of claim 1 wherein the face of the primary mirror is partially visible when said auxiliary mirror assembly is coupled thereto.

13. An auxiliary mirror assembly for coupling to a primary mirror assembly, the primary mirror assembly including a primary mirror including opposed side edges, and a frame including portions extending along at least a portion of the opposed side edges of the primary mirror, the auxiliary mirror assembly comprising:
   an auxiliary mirror having opposed side edges,
   a frame including portions extending along at least a portion of opposed side edges of the auxiliary mirror, the auxiliary mirror frame portions being adapted to be disposed substantially adjacent at least a portion of the primary mirror frame portions, and
   at least one torsion spring, said torsion spring biasing at least one of said auxiliary mirror frame portions into engagement with at least one of said primary mirror frame portions.

14. The auxiliary mirror assembly of claim 13 wherein the at least one of said frame portions extending along at least a portion of the opposed side edges of the primary mirror includes at least one recess or protrusion, and the at least one of said frame portions extending along at least a portion of opposed side edges of the auxiliary mirror includes the other of said at least one recess or protrusion configured for interfitting engagement with the recess or protrusion of the primary mirror frame portion to couple the auxiliary mirror assembly to the primary mirror assembly.

15. The auxiliary mirror assembly of claim 13 wherein the at least one of the frame portions extending along at least a portion of the opposed side edges of the auxiliary mirror comprises a flange, said spring biasing said at least one of the auxiliary mirror frame portions into engagement with said at least one primary mirror frame portion.

16. An auxiliary mirror retrofit arrangement for use with a primary mirror assembly, the primary mirror assembly having a reflective face and including a primary mirror including opposed side edges, and a frame including portions extending along at least a portion of the opposed side edges of the primary mirror, the retrofit arrangement comprising
   at least one strip of material adapted to be secured to at least one of the primary mirror frame portions, said strip including at least one of a plurality of recesses or protrusions,
   an auxiliary mirror assembly, the auxiliary mirror assembly comprising:
      an auxiliary mirror having side edges,
      a frame including portions extending along at least a portion of opposed side edges of the auxiliary mirror to superimpose at least a portion of the auxiliary mirror assembly on the face of the primary mirror, the auxiliary mirror frame portions being adapted to be disposed substantially adjacent at least a portion of said strip when secured to the primary mirror frame portion, at least one of said auxiliary mirror frame portions including at least one recess or protrusion configured for interfitting engagement with at least a portion of the recesses or protrusions of the strip to position the auxiliary mirror assembly in at least two positions along the primary mirror assembly.

17. The arrangement of claim 16 wherein the strip is formed of a metal material.

18. The arrangement of claim 16 wherein the strip is adapted to be secured to the primary mirror assembly by at least one of an adhesive, a weld, a rivet or a threaded fastener.

19. The arrangement of claim 16 wherein the auxiliary mirror assembly is adapted to be coupled to the strip at a plurality of locations.

20. The arrangement of claim 16 wherein a pair of strips is provided, said strips including a plurality of recesses, and said auxiliary mirror frame portions include a plurality of protrusions, said protrusions being configured to position the auxiliary mirror assembly at a plurality of positions along the strips.

* * * * *